(12) United States Patent
Giger et al.

(10) Patent No.: US 6,265,219 B1
(45) Date of Patent: *Jul. 24, 2001

(54) TRANSPONDER TAGGING OF CONSTITUENTS USED IN COMPOUND SYNTHESIS

(75) Inventors: Rudolf Karl Andreas Giger, Muttenz (CH); Henri Mattes, Brunstradt (FR); Andrew Malcolm Bray; Nobuyoshi Joe Maeji, both of Victoria (AU)

(73) Assignee: Mitokor, San Diego, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/739,843

(22) Filed: Oct. 30, 1996

(51) Int. Cl.$^7$ .................................................. G01N 33/532
(52) U.S. Cl. ............................. 436/56; 436/86; 436/524; 422/99; 422/119; 530/334
(58) Field of Search .................................. 436/56, 86, 89, 436/90, 524; 422/99, 102, 119; 530/334

(56) References Cited

U.S. PATENT DOCUMENTS

| | | | |
|---|---|---|---|
| 5,186,898 | * 2/1993 | Bridgham et al. | 422/102 |
| 5,252,962 | 10/1993 | Urbas et al. | 340/870.17 |
| 5,351,052 | 9/1994 | D'Hont et al. | 342/42 |
| 5,641,634 | * 6/1997 | Mandecki | 436/6 |
| 5,770,455 | * 6/1998 | Cargill et al. | 436/518 |

FOREIGN PATENT DOCUMENTS

| | | |
|---|---|---|
| 39 35 572 | 2/1991 | (DE) . |
| WO 94/11388 | 5/1994 | (WO) . |
| WO 96/24061 | 8/1996 | (WO) . |

OTHER PUBLICATIONS

Service, R.F. "Radio Tags Speed Compound Synthesis" Science, vol. 270, p. 577, Oct. 23, 1995.*
Armstrong et al., Microchip Encoded Combinatorial Libraries: Generation of a Spacially Encoded Library from a Pool Synthesis (1995).
Maeji et al., Peptide Research, 8:1 (1995), 33–38, Larger Scale Multipin Peptide Synthesis.
Maeji et al., Reactive Polymers 22 (1994), 203–212, Grafted supports used with the multipin method of peptide synthesis.
Central Animal Records, Letter of Welcome, Central Animal Records Aust. Pty. Ltd., Springvale South 3172, Victoria Australia (1995).

* cited by examiner

*Primary Examiner*—Jeffrey Snay
(74) *Attorney, Agent, or Firm*—Seed Intellectual Property Law Group, PLLC

(57) ABSTRACT

A synthesis member preferably comprises two elements: a crown and a stem. The stem includes a tag, such as a transponder, that is used to identify the synthesis member and/or the synthetic history of the synthesis member when used in the automated synthesis of compound libraries containing large numbers (e.g. 1000 or more) compounds. The crown provides the location at which compounds are synthesized. The combination of a crown for use with compound synthesis and stem allows the tracking of individual synthesis members from a library containing thousands of such synthesis members. Because each synthesis member is individually tracked and can be logged into a database and/or process flow control system, the synthesis of several thousand individual compounds in conventional containers, such as round bottom flasks is made possible using only traditional compound synthesis approaches.

18 Claims, 2 Drawing Sheets

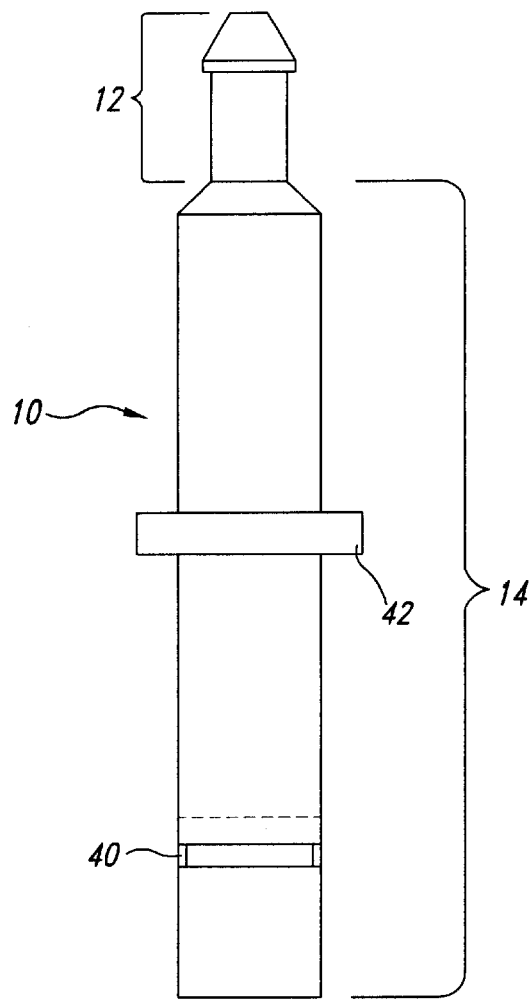
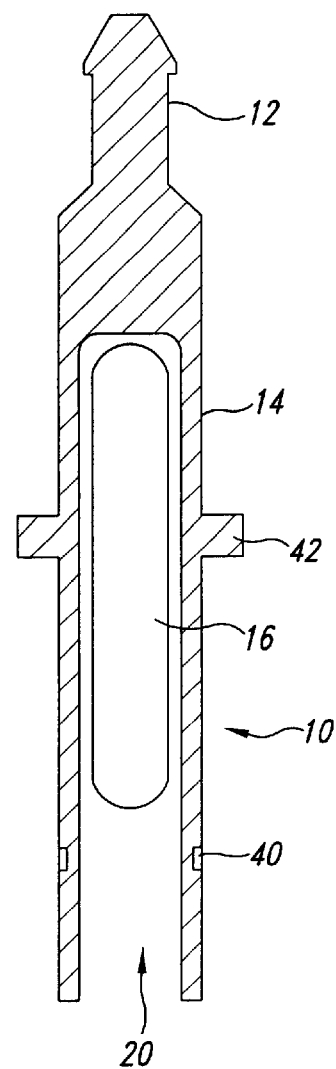
Fig. 1
Fig. 3
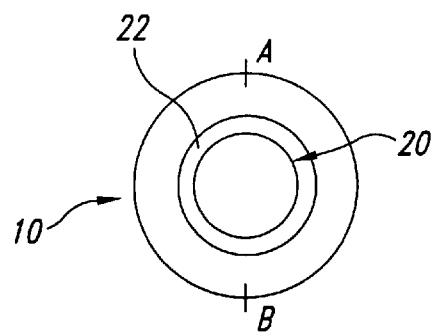
Fig. 2

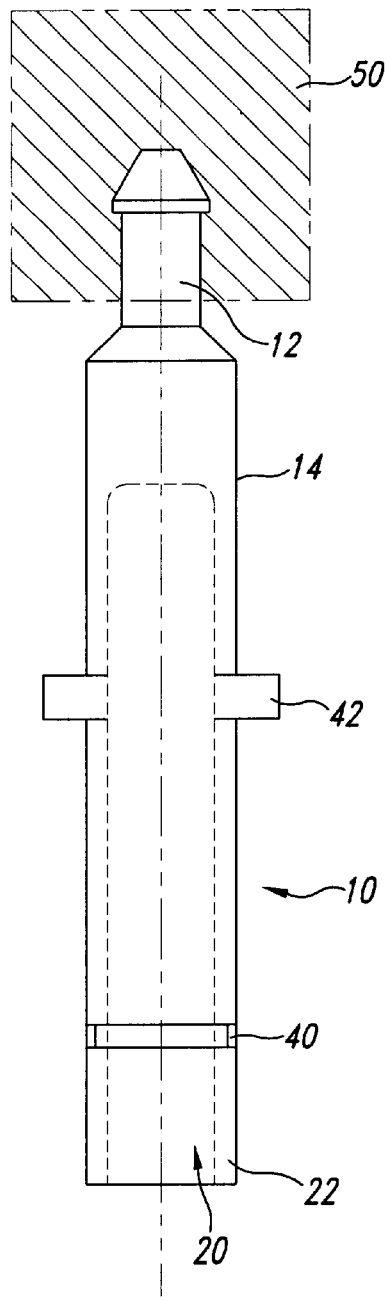
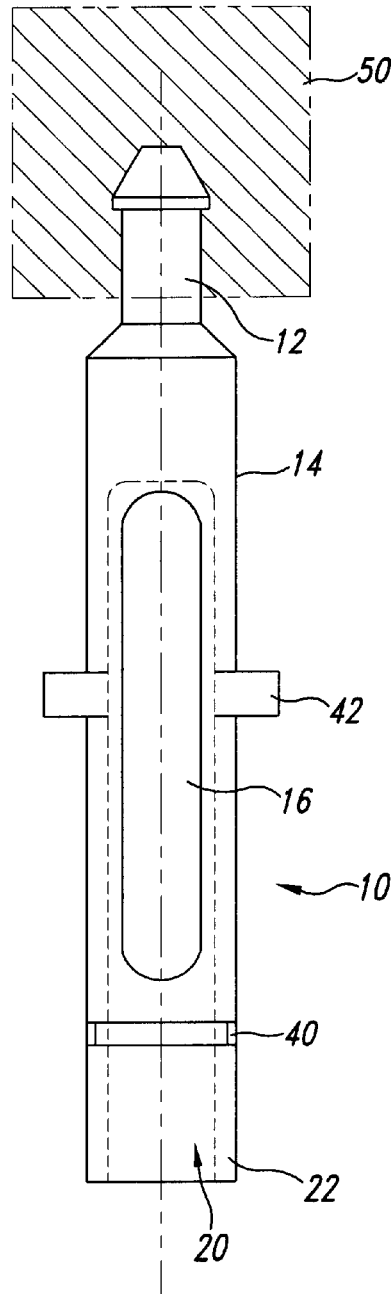
Fig. 4
Fig. 5

TRANSPONDER TAGGING OF CONSTITUENTS USED IN COMPOUND SYNTHESIS

BACKGROUND OF THE INVENTION

1. Technical Field

The invention relates to compound synthesis. More particularly, the invention relates to a method and apparatus for tagging the synthesis supports, hence allowing constituents used during various compound syntheses, hence reaction products to be identified, and sorting the constituents used during various compound syntheses.

2. Description of the Prior Art

Combinatorial synthesis of libraries of organic molecules is an important tool for, inter alia, the identification of biologically active compounds. Such libraries may be generated on a solid support, for example by parallel syntheses at an array of spatially separate or spatially addressable constituents, at which compounds are generated as individual products, i.e. single compounds, having structural identities related to their particular location in the reaction array.

Another approach generates compound mixtures, for example by using split and combine synthesis methods. Such approach requires a deconvolution procedure in which the component of interest must be identified from within the compound mixture by repetitive synthesis of smaller and smaller mixtures containing the component of interest. Once the compound is isolated as a single compound, its structure is subsequently determined.

Chemical tagging techniques are used to record the synthetic history of each of the constituents of a synthesis pool to facilitate the subsequent identification of selected members of the library. In practice, introduction, removal, and decoding of chemical tags comprises a large portion of the effort that is required to generate and screen mixture libraries.

It is known to use transponders to tag a particulate derivatised polystyrene resin solid phase contained in polypropylene mesh "tea bags", and record synthesis steps carried out during a combi-chem synthesis (see R. Armstrong, P. Tempest, J. Cargill, *Microchip Encoded Combinatorial Libraries: Generation of a Spatially Encoded Library from Pool Synthesis,* CHIMIA, June 1996). However, such resin-based tea bags are not suited for automated sorting or handling, and thus, such an approach is therefore not amenable to the synthesis of large libraries.

It would be advantageous to provide an efficient approach to the tagging and automated sorting of synthesis constituents that allowed the manipulation of large numbers of synthesis constituents, and therefore the automated synthesis of large compound libraries.

SUMMARY OF THE INVENTION

The invention provides a method and apparatus that uses a tag, such as a transponder, to identify the constituents used in complex compound syntheses. The invention features a unique rigid solid phase synthesis member (hereinafter referred to as synthesis member) that provides significant advantages over the prior art with regard to the handling of compound libraries and automation of synthesis of libraries containing large numbers of compounds (e.g. up to 10,000 or more compounds) or constituents.

The synthesis member preferably comprises two elements: a crown and a stem. In one method, the crown on a stem (the pin) is attached in an 8×12 Array to a pin holder allowing 96 pins to be handled concurrently but in principle, other numbers of pins may be used. The preferred format allows multiple handling and any number of pins may be used. The crown provides the location at which compounds are synthesized, while the stem is provided to carry information about the synthesis member and/or compound being synthesized.

In a preferred embodiment of the invention, a transponder in the form of a passive integrated circuit is located in the stem of such synthesis member. The combination of a crown for use with compound synthesis and stem requires no locating device such as a pin holder and allows the synthesis of libraries when processing thousands of such synthesis members.

An important aspect of the invention resides in the provision of a solid, typically rigid or resilient synthesis member, as opposed to prior art solid phase synthesis supports comprising particulate resinous materials. A solid synthesis member is readily handled by automated sorting systems and may be adapted for attachment/detachment mechanisms for crown from stem. Thus, the crown may be detachable from the stem and may be detachable from the synthesis member at the end of the synthesis and before compound cleavage from the crown. This arrangement provides a simple and effective approach to separating the transponder from the crown, e.g. for reuse. Further, because each synthesis member is individually tracked and can be logged into a database and/or process flow control system, the approach herein allows the synthesis of several thousand individual compounds in conventional containers, such as round bottom flasks using traditional compound synthesis methods as contrasted with prior art matrix systems, where one vessel for the synthesis of each individual compound has to be used.

BRIEF DESCRIPTION OF THE DRAWINGS

FIG. 1 is a side view of a preferred synthesis member according to the invention;

FIG. 2 is an end view of the preferred synthesis member according to the invention;

FIG. 3 is a section view of the preferred synthesis member of FIG. 2, taken along lines A–B in FIG. 2, according to the invention;

FIG. 4 is a cut-away view of the preferred synthesis member according to the invention; and FIG. 5 is a cut-away view of the synthesis member of FIG. 4 showing a transponder in place according to the invention.

DETAILED DESCRIPTION OF THE INVENTION

The invention provides a method and apparatus that uses a tag, such as a transponder, to identify the constituents used in compound array (complex) synthesis procedure. The invention features a unique synthesis member that provides significant advantages over the prior art with regard to the handling of compound libraries and automation of synthesis of compound libraries containing large numbers (e.g. from 1000 to 10,000 or more) of compounds.

The invention is particularly suited for multiple solid phase organic chemistry. For a background discussion of such technology, see (inter alia) the following:

J. A. Ellman, Solid phase and combinatorial synthesis of benzodiazepine compounds on a solid support, U.S. Pat. No. 5,288,514 (Feb. 22, 1994); and J. A. Ellman, Solid phase and combinatorial synthesis of compounds on a solid support, U.S. Pat. No. 5,545,568 (Aug. 13, 1996).

Known techniques for handling the various constituents to accomplish such synthesis may include (inter alia) the following:

J. H. Hardin and F. R. Smietana, Automating combinatorial chemistry: A primer on benchtop robotic systems, Molecular Diversity 1 (1995), pp. 266–270, ESCOM Science Publishers B. V., Leiden, The Netherlands.

A. K. Judd, Multiple polymer synthesizer, U.S. Pat. No. 5,053,454 (Oct. 1, 1991).

D. R. Cody, S. H. H. DeWitt, J. C. Hodges, J. S. Kiely, W. H. Moos, M. R. Pavia, B. D. Roth, M. C. Schroeder, C. J. Stankovic, Apparatus for multiple simultaneous synthesis, U.S. Pat. No. 5,324,483 (Jun. 28, 1994).

FIG. 1 is a side view of a preferred synthesis member according to the invention. The synthesis member 10 preferably comprises two elements: a crown 12 and a stem 14. The preferred format allows synthesis and handling of individual compounds, e.g. with 96 synthesis members attached to a synthesis member holder but, in principle, any number of synthesis members may be used. The crown 12 provides the location at which compounds are synthesized, while the stem 14 is provided to carry information about the synthetic history of the compound. The combination of a crown for use with compound synthesis and stem allows the tracking of individual synthesis members from an array containing thousands of such synthesis members.

FIG. 2 is an end view of the preferred synthesis member according to the invention. The stem of the synthesis member comprises a tubular wall 22 defining a cavity 20 that is adapted to contain a tag. While a tubular wall is shown in FIG. 2 in connection with the presently preferred embodiment of the invention, it will be appreciated by those skilled in the art that the stem may be produced in any shape as long as it provides a rigid container for the tag.

FIG. 3 is a section view of the preferred synthesis member of FIG. 2, taken along lines A–B in FIG. 2, according to the invention. In a preferred embodiment of the invention, a transponder 16 in the form of an integrated circuit, is located in the stem of the synthesis member.

An important aspect of the invention resides in the provision of a solid synthesis member, as opposed to prior art resinous solid phase synthesis supports. A solid synthesis member is readily incorporated into automated sorting systems that may include crown attachment/detachment mechanisms. Thus, the stem may be detachable from the synthesis member, if desired. This arrangement provides a simple and effective approach to separating the transponder stem from the crown, e.g. for reuse. Further, because each synthesis member is individually tracked and can be logged into a database and/or process flow control system, the approach herein allows the synthesis of several thousand individual compounds in conventional containers, such as round bottom flasks, using traditional compound synthesis techniques.

The invention provides a small, modular format for simultaneously synthesizing several different compounds. The presently preferred embodiment of the invention is considered suitable for efficiently synthesizing about 1,000 to about 10,000 compounds or more simultaneously. A key aspect of the invention is the ability to track these individual synthesis members at any give time. Rather than identifying the compound by its matrix location (which can be cumbersome and tedious in a library that contains several thousand compounds), the invention provides a means by which information can be read from or written to a tag, such as a microchip or transponder. The use of a transponder provides a particular identifying marker for each synthesis member. Using an appropriate data processing system, the synthetic history may be recorded for each specific synthesis member. Additionally and alternatively, a transponder may be written to and thereby identify the various processes within the synthesis to which a synthesis member has been subjected.

While it is therefore possible to reprogram the transponders, it is not typically necessary to do so because the unique identification characteristic, e.g., number of each transponders could be assigned to a database. As the transponder is reused or as the constituent associated with the crown portion of the synthesis member in which the transponder is located is processed, it is only necessary to update the database. However, if desired (for example, where the synthesis members are used in a multistage process) it is possible to identify each stage of processing by updating the transponder. Thus, although the transponders may be reprogrammed, in most applications there is no need for them to be reprogrammed.

In one application of the invention, e.g. solid-phase organic chemistry, one part of the synthesis member (i.e. the crown 12) provides the synthesurface, where the compound is synthesized. The second part of the synthesis member (i.e. the stem 14) comprises or contains the tag. The preferred tag is formed within a piece of plastic, although it may be formed from any other suitable material. The information contained in the tag may comprise a bar code or color code on the tag outer surface. However, in the preferred embodiment of the invention, the tag contains a microchip transponder enclosed therein.

Typical transponders are passive devices, i.e. they operate without an internal power supply. They include a receive antenna for receiving an input signal, a rectifier that demodulates a portion of the input signal and uses same as a power source, a frequency generator and modulator that receives the input signal and that outputs a data carrier signal having a frequency independent of the input signal frequency, and a programmable memory that produces identification and other data which are combined in an output signal. Such transponders may be selectively written to and read from during operation. Microchip transponders are well known in the art and are therefore not discussed in detail herein (see, for example D. Urbas, D. Ellwood, System Monitoring Programmable Implantable Transponder, U.S. Pat. No. 5,252,962 (Oct. 12, 1993); and L. D'Hont, A. Tip, H. Meier, Transponder Systems For Automatic Identification Purposes, U.S. Pat. No. 5,351,052 (Sep. 27, 1994). Preferred transponders include those available from Baumer Electric AG, Switzerland which, based on measurements of amplitude modulated signal transmission, are particularly suitable for use in industrial environments where electromagnetic noise could otherwise disturb signal transmission.

FIG. 4 is a cut-away view of the preferred synthesis member according to the invention; and FIG. 5 is a cut-away view of the synthesis member of FIG. 4 showing a transponder in place according to the invention. After a transponder 16 is placed within the cavity 20 defined by the walls 22 of the stem, the container 20/22 is sealed, e.g. by a crimp 40. Although there are many correct methods for sealing the container, it is thought that in practice a heat seal is the easiest way to seal the container. Nonetheless, the container may be sealed by any known technique, e.g. with adhesives, pressure bonding, and press-to-seal closures.

In contrast to the prior art, the invention provides a synthesis member formed from a rigid material, such as a solid piece of plastic, e.g. a polypropylene copolymer rod. The material may be any type of polymer, such as polyethylene, Teflon, or other fluorinated polymers. In principle, any other material can be used, as long as the material is stable under the chemistry conditions encountered during the compound synthesis.

A typical synthesis member has an overall length of about 26.5 mm, where the stem has a length of about 20.9 mm and the crown has a length of about 5.6 mm. The inner diameter of the stem is about 2.5 mm and provides a cavity that is about 18 mm long. The outer diameter of the stem is about 3.8 mm. The collar is typically spaced along the stem about 6.0–6.4 mm from the crown and has a diameter of about 6 mm. It should be appreciated that these dimensions are provided for purposes of describing the presently preferred embodiment of the invention and that the invention is not limited to any particular size of shape of synthesis member or by how the crown and stem are joined together to form the synthesis member.

Both the crown and the stem may be formed from a single piece of plastic, although the crown preferably comprises a plastic body onto which another polymer or organic chemical is grafted. Thus, the crown may be a two-phase polymer.

One unique aspect of the rigid, tagged synthesis member taught herein is that each synthesis member may initially be placed in any random location within a library and, nonetheless, can always be identified when needed because of the tag which it carries and because the use of a rigid structure make it amenable to automation. Thus, the rigidity of the synthesis member, along with the crown 12 and stem 14, allows the synthesis member 10 to be located and sorted by an automated sorting machine.

To this end, the preferred embodiment of the invention also includes a collar 42 to both retain the synthesis member within an apertured support, e.g. in a matrix, and to allow automated detachment of the compound-carrying crown from the stem. The collar is useful for locating the synthesis member in a position, e.g. where the members are moved down a channel and past a reader which identifies and logs the members. The synthesis members are next located in a particular position or are dropped into a particular container, e.g. round bottom flask, for one or more chemical reactions or washing steps to take place. These procedures may be repeated, typically using different reagents for different synthesis steps, until the desired product has been synthesized. By means of appropriate automated apparatus, individual synthesis members may be tracked during the synthesis procedure and routed to specific reaction vessels for particular reactions to take place. An appropriate data processing system is used to keep track of the synthetic history of each synthesis member, using its specific identifying tag. At the end, the crown is placed in a well and the desired individual compound is obtained after cleavage.

Generally, because one synthesis member is provided for each compound to be synthesized, where one (preferably detachable) part of the synthesis member is used for carrying out the synthesis and another part of the synthesis member provides a tag (e.g. the transponder), the tag is readily detached and reused many times. This provides an efficient, cost-effective method of tracking and dispensing the constituents.

Additionally, the tagging may be used to sort synthesis members into specially defined groups based on their chemical structure to avoid or exploit additive biological effects, prior to cleavage of the products from the crowns for screening as pools of compounds instead of as individual compounds. For instance, the synthesis members may be sorted into groups in which all compounds are of diverse or different chemical types, prior to cleavage of the products from the crowns to provide pools of compounds of diverse chemical nature for screening as pools of compounds instead of as individual compounds.

Alternatively, the crown 12 may define a process site that is placed into a process environment 50 for processing in an assembly line fashion. In this embodiment of the invention, the transponder could also be enclosed within the crown itself, and synthesis could then proceed at the crown as described above. However, in such embodiment, the transponder is not easily separated the organic chemistry is performed on the crown that contains the transponder. Nonetheless, this approach may be preferred for some syntheses.

Although the invention is described herein with reference to the preferred embodiment, one skilled in the art will readily appreciate that other applications may be substituted for those set forth herein without departing from the spirit and scope of the present invention. Accordingly, the invention should only be limited by the Claims included below.

What is claimed is:

1. An automated method of synthesizing a compound on the surface of a crown, said method comprising:

contacting under automated control a rigid synthesis member consisting of separable crown and stem portions, wherein said stem portion is reuseable and comprises a tag, with a first reagent under conditions sufficient for a chemical reaction to occur on said crown portion;

reading said tag;

contacting said rigid synthesis member with a second reagent under conditions sufficient for a chemical reaction to occur to produce said compound on said crown portion;

reading said tag; and separating said crown portion from said stem portion;

whereby a chemical compound is synthesized on said crown.

2. The method according to claim 1, wherein said tag is selected from the group consisting of a bar code, a color code, and a transponder.

3. The method according to claim 1, wherein said method further comprises contacting said rigid synthesis member with an additional reagent and reading said tag at least one additional time prior to said separating step.

4. The method according to claim 1, wherein contact of said rigid synthesis member with a reagent in each of said contacting steps occurs by introducing said rigid synthesis member into a container in which said reagent is present.

5. The method according to claim 1, wherein said method further comprises cleaving said synthesized compound from said crown.

6. The method according to claim 5, wherein said cleaving step occurs prior to said separating step.

7. The method according to claim 5, wherein said cleaving step occurs after said separating step.

8. The method according to claim 1, wherein said rigid synthesis member further comprises a collar and said reading comprises moving said rigid synthesis member past a detector in a correct orientation by means of said collar.

9. An automated method of synthesizing a compound on the surface of a crown, said method comprising:

placing under automated control a rigid synthesis member consisting of separable crown and stem portions, wherein said stem portion is reuseable and comprises a transponder, into a container comprising a first reagent under conditions sufficient for a chemical reaction to occur on said crown portion;

removing said rigid synthesis member from said container;

reading said transponder;

placing said rigid synthesis member into a container comprising a second reagent under conditions sufficient for a chemical reaction to occur to produce said chemical compound on said crown portion;

removing said rigid synthesis member from said container;

reading said transponder; and separating said crown portion form said stem portion;

whereby a chemical compound is synthesized on said crown.

10. The method according to claim 9, wherein said method further comprises carrying out said placing, removing and reading steps at least one additional time prior to said separating step.

11. The method according to claim 9, wherein said method further comprises cleaving said compound from said crown.

12. The method according to claim 11, wherein said cleaving occurs prior to said separating.

13. The method according to claim 11, wherein said cleaving occurs after said separating.

14. The method according to claim 9, wherein said rigid synthesis member comprises a collar and said reading comprises moving said rigid synthesis member past a detector in a correct orientation by means of said collar.

15. An automated method of simultaneously synthesizing at least about 1000 compounds, said method comprising:

synthesizing each of said at least about 1000 compounds on a separate crown surface of an individual rigid synthesis member by:

contacting under automated control a rigid synthesis member consisting of separable crown and stem portions, wherein said stem portion is reuseable and comprises a tag, with a first reagent under conditions sufficient for a chemical reaction to occur on said crown portion;

reading said tag;

contacting said rigid synthesis member with a second reagent under conditions sufficient for a chemical reaction to occur to produce said compound on said crown portion;

reading said tag; and separating said crown portion from said stem portion.

16. The method according to claim 15, wherein said tag is selected from the group consisting of a bar code, a color code, and a transponder.

17. The method according to claim 15, wherein said method further comprises contacting said rigid synthesis member with an additional reagent and reading said transponder at least one additional time prior to said separating step.

18. The method according to claim 15, wherein said rigid synthesis member comprises a collar and said reading comprises moving said rigid synthesis member past a detector in a correct orientation by means of said collar.

* * * * *